Dec. 15, 1925.  
R. K. MASON  
1,566,156  
MOTOR STARTING SWITCH  
Filed July 1, 1922  
4 Sheets-Sheet 4
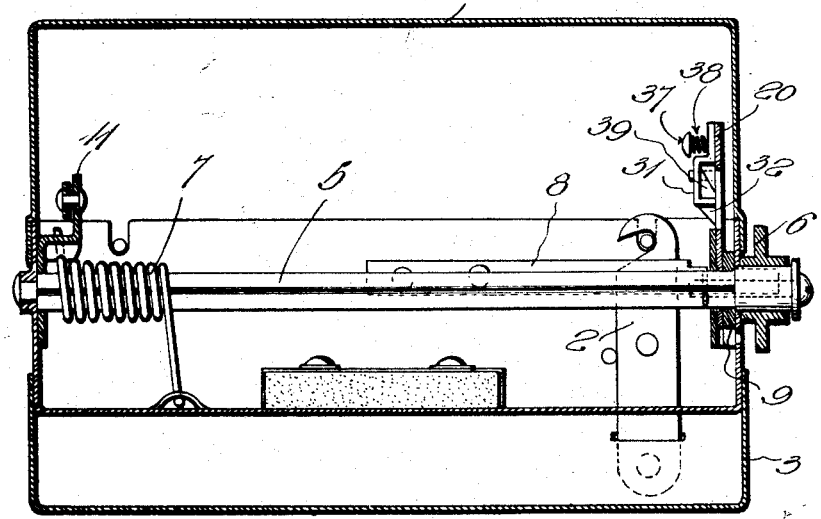
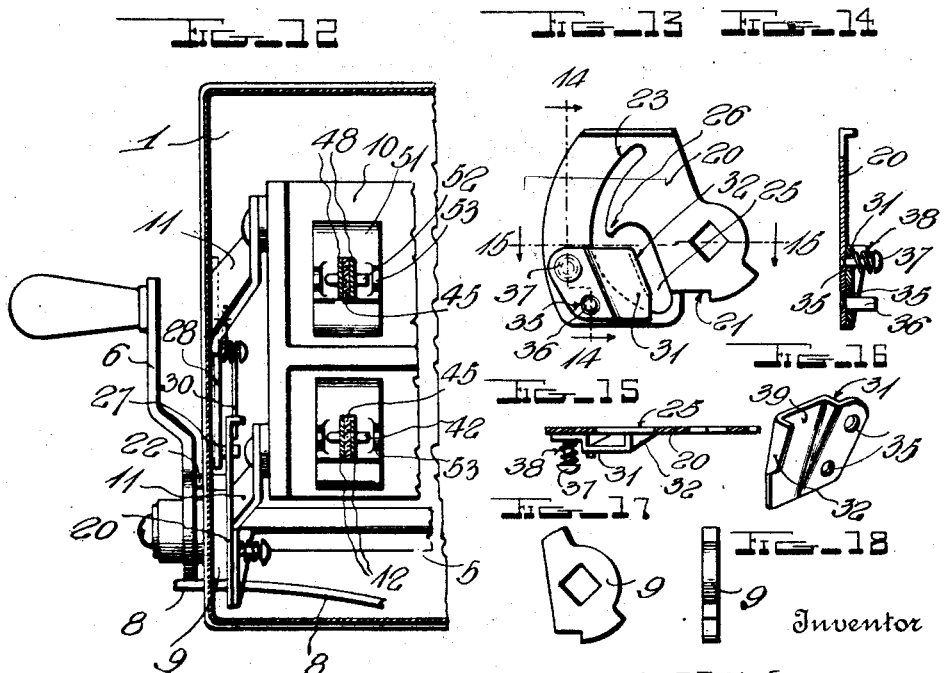
Inventor  
Ralph K. Mason Patented Dec. 15, 1925.

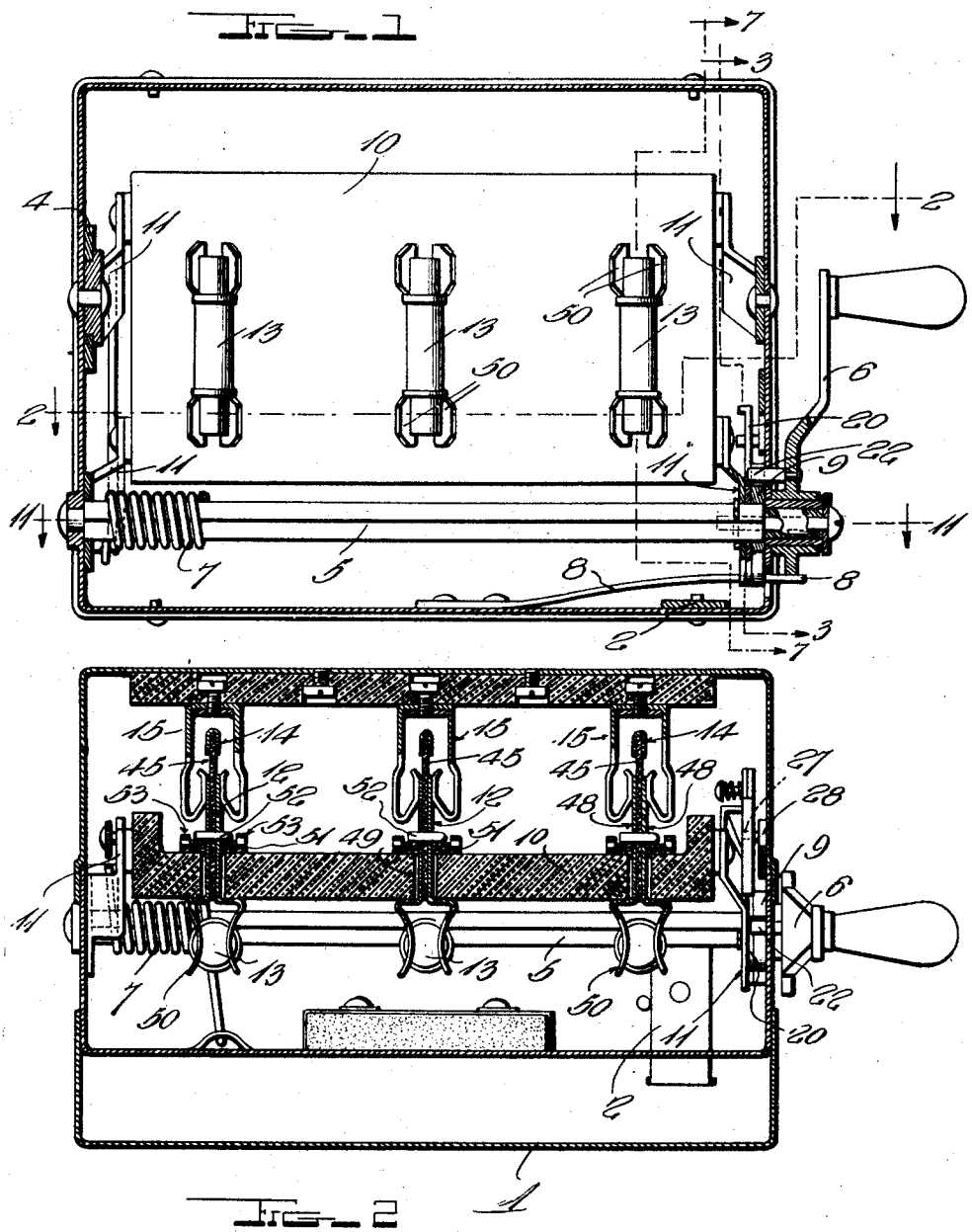

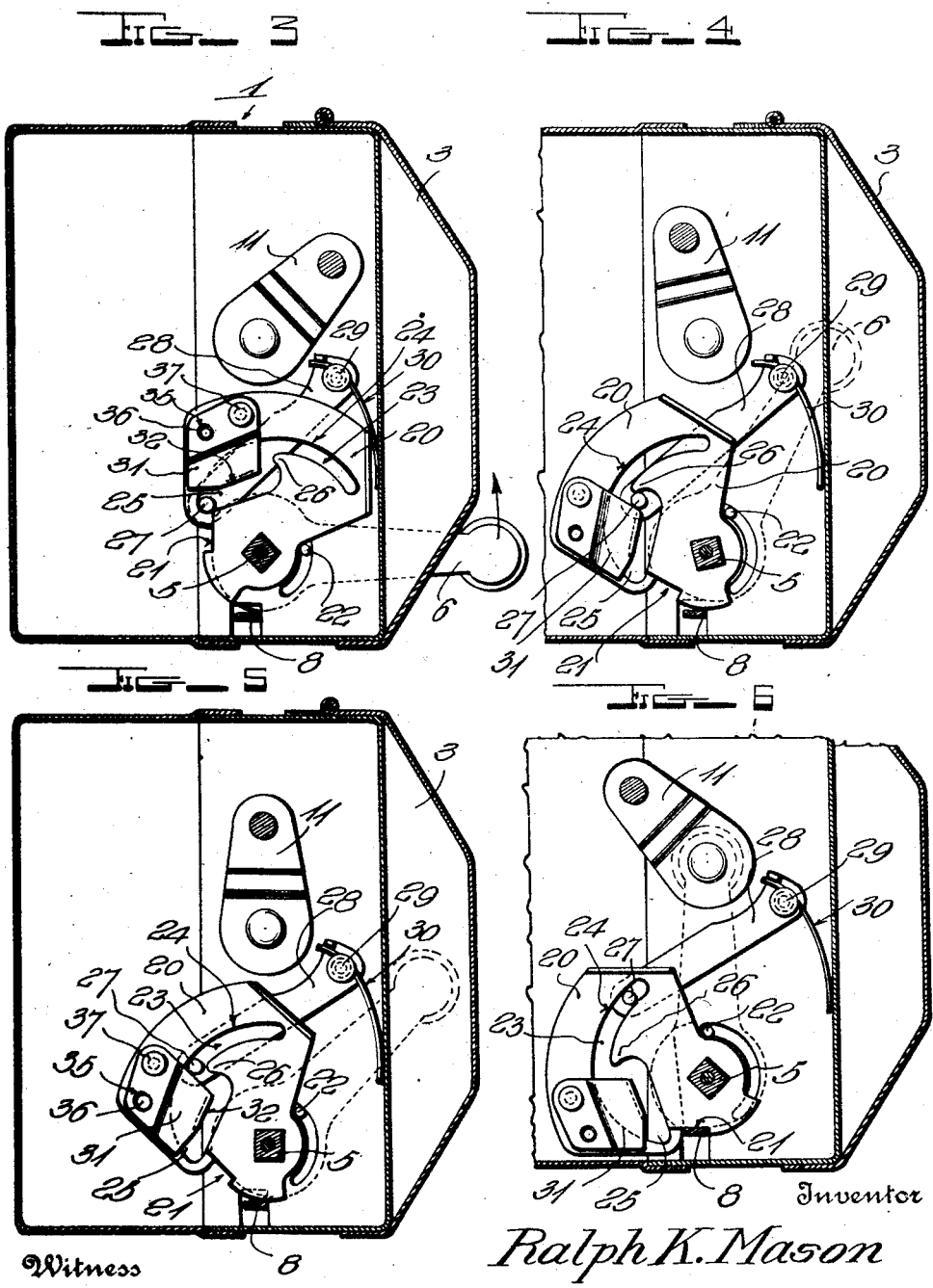

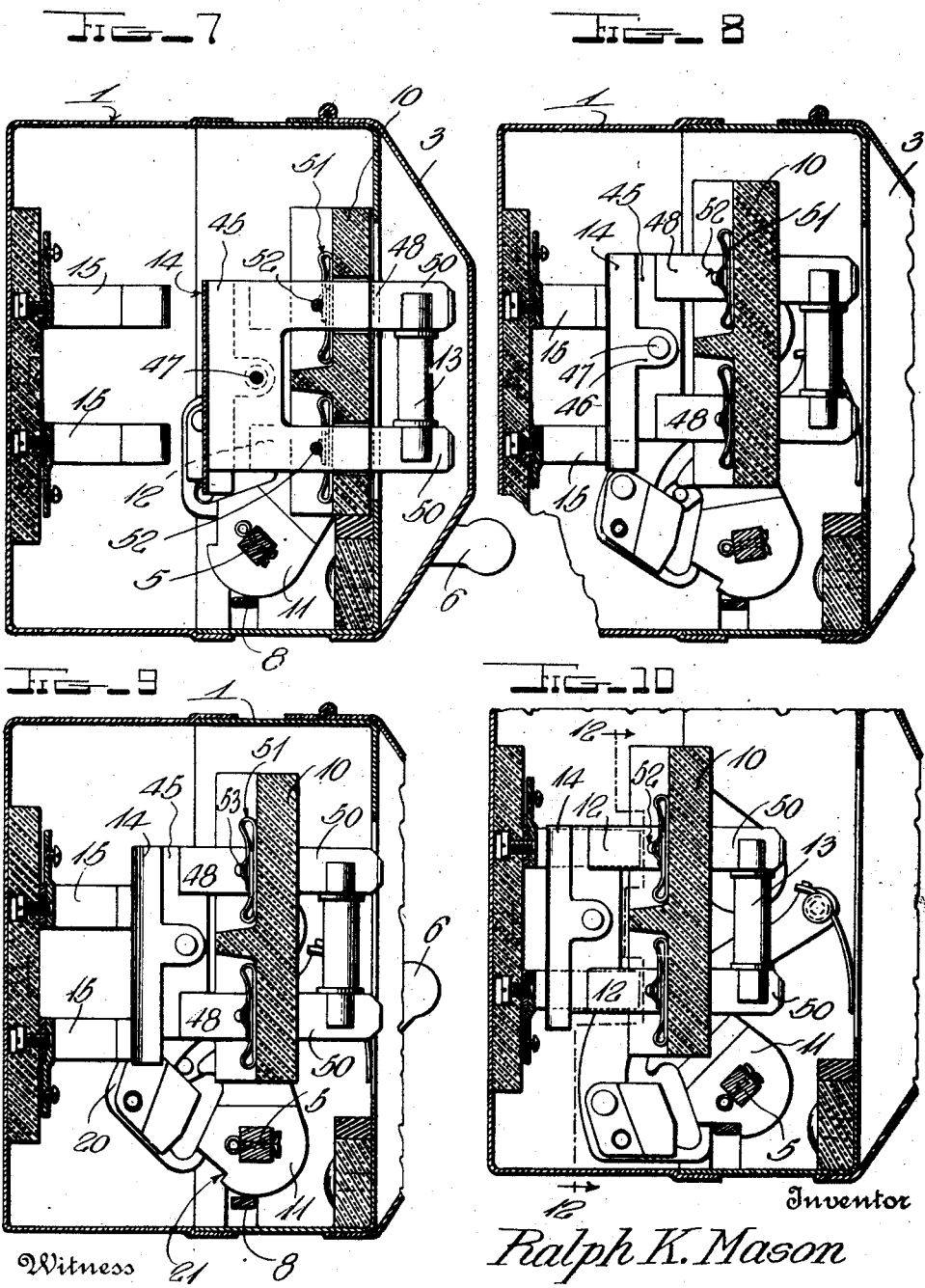

1,566,156

UNITED STATES PATENT OFFICE.

RALPH K. MASON, OF BANTAM, CONNECTICUT, ASSIGNOR OF ONE-HALF TO JOHN H. LANCASTER, OF LITCHFIELD, CONNECTICUT.

MOTOR-STARTING SWITCH.

Application filed July 1, 1922. Serial No. 572,237.

*To all whom it may concern:*

Be it known that I, RALPH K. MASON, a citizen of the United States, residing at Bantam, in the county of Litchfield and State of Connecticut, have invented certain new and useful Improvements in Motor-Starting Switches; and I do declare the following to be a full, clear, and exact description of the invention, such as will enable others skilled in the art to which it appertains to make and use the same.

This invention relates to electric switches and the principal features thereof are designed for use on motor starting switches of the type in which a movable switch member is shiftable to one position for starting the motor without throwing a fuse or the like into the circuit and is then movable in the same direction to another position for running the motor with a fuse or other automatic circuit cutout, in circuit. In switches of this nature, there is often a tendency on the part of the operator to throw the switch quickly to running position, without pausing a sufficient time in starting position, to enable the motor to pick up speed before bringing the fuse or the like into circuit, with the result that unnecessary blowing of fuses takes place.

The principal object of this invention is to provide extremely simple, yet highly efficient means for forcing the operator to pause when the switch is in starting position, before further shifting to running position, thereby preventing improper closing of the switch and useless blowing of fuses.

With the foregoing in view, the invention resides in the novel subject matter hereinafter described and claimed, the description being supplemented by the accompanying drawings.

Figure 1 is a front elevation partly in section of a motor starting switch embodying my improvements.

Figure 2 is a horizontal sectional view as indicated by line 2—2 of Fig. 1.

Figures 3, 4, 5 and 6 are sectional views on the line 3—3 of Fig. 1, showing different positions of the controlling means which forces the operator to pause when the switch is in starting position, before throwing it into running position.

Figures 7, 8, 9 and 10 are transverse sectional views on line 7—7 of Fig. 1 showing the switch positions which correspond with the positions of the controlling means, shown in Figs. 3, 4, 5 and 6, respectively.

Figure 11 is a horizontal sectional view on line 11—11 of Fig. 1.

Figure 12 is a detail sectional view as indicated by line 12—12 of Fig. 10.

Figure 13 is a detail side elevation of the track-forming plate and the switch tongue co-operable therewith, constituting parts of the controlling mechanism which insures proper closing of the switch.

Figures 14 and 15 are sectional views as indicated by the lines 14—14 and 15—15 respectively of Fig. 13.

Figure 16 is a detail perspective view of the switch tongue.

Figures 17 and 18 are respectively a side elevation and edge view of a plate which is instrumental in establishing a lost motion connection between the movable switch member and its operating handle.

In the drawings above briefly described, the numeral 1 designates a sectional switch casing whose sections are detachably secured together by means including a pivoted latch 2 which is controlled by a door 3 with which the front of the casing is provided, these several features of construction being protected by my allowed U. S. application, Serial No. 386,126, filed June 2nd, 1920. There is an interlock provided between the door 3 and the movable switch parts, a portion of which is designated by the reference numeral 4 in Fig. 1, but this interlock constitutes no part of the present invention, as it is protected by my allowed U. S. application, Serial No. 309,280, filed July 8, 1919.

A rock shaft 5 extends across the casing and is connected with the movable switch member for operating the same, a handle 6 is mounted on the outer end of this shaft for turning it in switch-closing position against the tension of a switch opening spring 7, and a latch 8 co-operates with a plate 9 on the rock shaft to hold the latter in switch-closed position until said latch 8 is released by retrograde motion of the handle 6. This general arrangement is protected by my allowed U. S. application, Serial No. 386,125, filed June 2nd, 1920.

The numeral 10 designates an insulating carrying base for the starting and running contacts of the switch and this base is mounted in the casing and connected with the rock shaft 5, by parallel linkage 11, in the same manner as disclosed in the applications above referred to and in my pending U. S. application, Serial No. 391,032, filed June 23rd, 1920. This base carries running contacts 12 adapted to be connected electrically by fuses or other automatic circuit cutouts 13 and nonfusible starting contacts or bridges 14, having certain novel features hereinafter described, these starting and running contacts being co-operable with fixed contacts 15 to which line and load wires are connected. When the movable base 10 is in the position disclosed in Fig. 7, all contacts 12 and 14 are out of engagement with the fixed contacts 15, but when the handle 6 is moved to engage the contact 14 with the contacts 15, by moving the base 10 to the position shown in Fig. 8, the switch is in motor-starting position with no fuse or other automatic circuit cutout in operation. The controlling means referred to above forces the operator to momentarily pause with the switch in this position before he can thrown the movable base 10 to the position depicted in Fig. 10, in which position the starting contact 14 is out of engagement with the contacts 15 and the fused running contacts 12 are electrically engaged with said contacts 15. The controlling mechanism in question preferably assumes the form described below, but may be varied within quite a wide range.

The numeral 20 designates a flat plate fixedly mounted upon the handle-carrying end of the rock shaft 5 but disposed within the casing, this plate being preferably in contact with the plate 9 and one of the links 11, as shown most clearly in Figs. 1 and 2, and these three parts are by preference jointly notched as indicated at 21, for co-action with the latch 8. Moreover, the plate 20 is preferably shaped to conform to the active portion of the plate 9 which co-acts with the handle-carried pin 22 in providing the lost motion connection above referred to. Plate 20 is provided with an arcuate slot 23 having an uninterrupted edge wall 24, said slot being increased in width at one end as indicated at 25, so that a stop shoulder 26 is provided between the ends of the other edge wall of said slot. A shoe or pin 27 is received in the slot 23 and when the switch is open, (see Figs. 3 and 7) this pin stands at the enlarged end of said slot. A carrier is provided for the pin 27 which is preferably in the form of a link 28 pivoted at 29 to one side of the casing 1 and provided with a spring 30 which exerts a constant stress to move the pin toward the uninterrupted edge wall 24 of the slot, for a purpose to appear.

A switch tongue 31 is yieldably carried by one side of the plate 20 and extends over the widened end 25 of the slot 23, with its inner edge 32 disposed in substantially parallel relation with the irregular edge wall of the slot, between the stop shoulder 26 and the end of said slot which normally received the pin 27, as in Fig. 3. The distance between the slot wall and the edge 32 of the switch tongue 31, is ample to receive the pin 27 as shown, whereby when the switch is moved from the position of Figs. 3 and 7 to that illustrated in Figs. 4 and 8, the pin 27 will travel along the edge 32 of the tongue 31, being held in contact with said edge by the action of the spring 30. As soon as the starting contact 14 is well engaged with the contacts 15 as shown in Fig. 8, the pin 27 snaps from the end of the tongue 31 and is caught by the stop shoulder or nose 26 as illustrated in Fig. 4, the result being that the closing motion of the switch is temporarily arrested. By moving the control handle 6 retrogradely to a slight extent, however, the pin 27 snaps from the shoulder 26 into contact with the uninterrupted edge wall 24 of the slot 23, as illustrated in Figs. 5 and 9, the starting contact 14 being still in operative engagement with the contacts 15. Continued forward movement of the handle 6 may now move the switch to running position as indicated in Figs. 6 and 10, in which position the starting contact 14 is disengaged from the contacts 15 and the running contacts 12 are in engagement with said contacts 15 so that the fuse or the like 13 is included in the circuit. When complete running position is reached, the latch 8 comes into play to hold the switch closed as will be clear by reference to Figs. 6 and 10, but until this completely closed stage is reached, the spring 7 will act to reopen the switch, if for any reason, the handle 6 is released, it being thus insured that the switch cannot be left for any injurious length of time in a partially closed condition, for instance, with the starting contact 14 engaged operatively with the contacts 15. A novel construction is necessary with respect to the switch tongue 31, to permit the pin 27 to pass this tongue during the opening of the switch, either before complete closing or after operation of the switch. The construction described below is preferably employed for this purpose.

The tongue 31, in the present showing, is provided with a pair of openings 35 which loosely receive pins 36 and 37 carried by the plate 20, the pin 37 being provided with a head against which a coil spring 38 reacts to hold the tongue 31 in proper contact with the plate 20 as shown for instance in Fig. 15. While this spring 38 retains the tongue 31 in proper position for co-action with the pin 27 during closing of the switch, it also allows the tongue 31 to yield out of the path of the pin 27 during return movement of the latter along the uninterrupted edge wall 24 when the switch is moving toward open position. The tongue is provided with some suitable cam to engage the pin 27 and thus shift said tongue laterally against the action of the spring 38 during the return movement of said pin, and while this cam might be of any preferred form, I prefer that the portion of the tongue which extends over the wide flat end 25, shall be outwardly stamped from the plate 20 to provide a channel 39 which gradually decreases in depth from a point adjacent the shoulder 26 to the opposite end of the tongue. The pin 27 enters the deep end of this channel and due to the decreasing depth of the latter, the tongue 31 is caused to yield so that it will not resist the proper movement of the pin.

While the details just described for effecting proper checking of the switch in starting position, are preferably used, it will be understood that in some forms of construction, a substantial reversal of parts might be effected. For instance, instead of having the plate 20 turn with the rock shaft 5, this plate or an equivalent plate might well be stationary, in which case the pin or shoe 27 would move with the movable switch member. Furthermore, while it is preferred that the pin 27 shall cause yielding of the tongue 31 during the opening movement of the switch, it will be seen that said tongue might in some instances effect yielding of the pin to carry out the same end.

While the operation of the controlling mechanism will probably be clear from the foregoing detailed description, it will be well to briefly set forth its general operation. When the switch stands open (Fig. 7), the plate 20 and the pin 27 bear the relation shown in Fig. 3. Movement of the switch handle 6 in the proper direction, will bring the starting contact 14 into engagement with the contacts 15 as shown in Fig. 8 and movement of the switch parts is here temporarily arrested by engagement of the pin 27 with the shoulder 26 as disclosed in Fig. 4, so that the switch is checked in starting position an ample time to insure that the motor shall pick up the required amount of speed before shifting the switch to running position. When the parts stand in the momentarily arrested position in question, slight retrograde motion of the handle 6 will permit the pin 27 to clear the stop shoulder 26 as shown in Fig. 5, but this retrograde motion is not sufficient to disengage the contact 14 from the contacts 15, as will be clear by reference to Fig. 9. Movement of the handle again in a forward direction will now move the switch to the running position disclosed in Figs. 6 and 10, and when this position is reached, the plate 20 may well strike one side of the casing 1 to limit the closing movement, whereupon the latch 8 comes into play to lock the switch closed.

The mere contact of plate 20 with the latch 8 may be relied upon to limit the closing movement of the switch instead of having said plate strike the casing or other preferred stop means may be employed, but I do not intend that this stop means shall include the pin 27 striking the narrow end of the slot 23, in view of the fact that if this were allowed, unnecessary strain would be placed upon said pin in limiting the entire closing of the switch as well as movement thereof to starting position.

The starting contact 14 is preferably in the form of a strip of metal stamped into channel form to bind the edge of an insulating plate 45 which carries said contact, the latter being provided with ears 46 straddling the plate and secured thereto by a rivet or the like 47. This plate is preferably of the U-shape shown clearly in Fig. 7 and the arms of said plate are here shown interposed between a pair of metal strips 48 of which each contact 12 is formed (see more particularly Fig. 2). These strips pass rather loosely through an opening 49 formed in the base 10 and are bent to form fuse clips 50 whose shouldered inner ends rest against the front sides of said base. At the rear side of the base, a suitable stamped metal spring 51 is located, said spring having a slot through which the strips 48 pass, so that they are held in tight contact with opposite sides of the interposed arm of the plate 45. A pin 52 is passed through this arm and the strips 48 as shown clearly in Figs. 2 and 7 to 10, whereby the arm is held against withdrawal from its position between said strips. This pin forms a shoulder against which the spring 51 thrusts to yieldably retain the contact 12 in any position to which it may be shifted within the opening 49 by engagement either of this contact or the contact 14 with the clips 15. To hold the pin 52 against accidental release, the spring 51 is provided with outwardly stamped shoulders 53 at the ends of said pin as shown most clearly in Fig. 2 and Figs. 7 to 10.

The arrangement just described constitutes an extremely simple and inexpensive, yet very desirable means for relatively associating the moving contacts in the desired manner, for mounting them upon the base 10 and for insulating them from each other.

Since excellent results have been obtained from the several details herein shown and described, these details are preferably followed in the device as manufactured. Nevertheless, it is to be understood that within the scope of the invention as claimed, numerous changes may be made.

I claim:

1. Control means for a switch having starting and running positions, comprising a track, a track-engaging shoe, the one member being relatively stationary while the other member moves concurrently with the switch, yieldable means mounting said shoe and exerting a constant lateral stress thereon toward said track, a switch tongue associated with said track along which said shoe travels when the switch member is moved to starting position, whereby to shift said shoe laterally from said track until the end of said tongue is reached, and a stop opposite said track for temporarily arresting forward movement of said shoe when it leaves said switch tongue until said shoe is retrogradely moved and disengaged from said stop, provision being made whereby said shoe and tongue may relatively yield transverse to the plane of movement of the movable member, permitting the shoe to pass the tongue without being shunted from the track when the switch member is moved to off position.

2. Control means for a switch having starting and running positions, comprising a track, a track-engaging shoe, the one member being relatively stationary while the other member moves concurrently with the switch, yieldable means mounting said shoe and exerting a constant lateral stress thereon toward said track, a switch tongue associated with said track along which said shoe travels when the switch member is moved to starting position, whereby to shift said shoe laterally from said track until the end of said tongue is reached, a stop opposite said track for temporarily arresting forward movement of said shoe when it leaves said switch tongue until said shoe is retrogradely moved and disengaged from said stop, and yieldable means connecting said switch tongue with said track for permitting said tongue to yield transverse to the plane of movement of the movable member when said shoe moves retrogradely with movement of the switch to off position.

3. Control means for a switch having starting and running positions, comprising a track, a track-engaging shoe, the one member being relatively stationary while the other member moves concurrently with the switch, yieldable means mounting said shoe and exerting a constant lateral stress thereon toward said track, a switch tongue associated with said track along which said shoe travels when the switch member is moved to starting position, whereby to shift said shoe laterally from said track until the end of said tongue is reached, and a stop opposite said track for temporarily arresting forward movement of said shoe when it leaves said switch tongue until said shoe is retrogradely moved and disengaged from said stop, said tongue having a cam in the return path of said shoe and oblique to the plane of movement of the movable member for relatively shifting said shoe and tongue transverse to said plane while the switch member is being moved to off position, permitting said shoe to return to normal switch open position.

4. A structure as specified in claim 2; said tongue having a cam in the return path of said shoe and oblique to the plane of movement of the movable member for positively moving said tongue to an inoperative position when the switch moves to off position.

5. Control means for a switch having starting and running positions, comprising a plate and a shoe, the one being relatively stationary, while the other is movable concurrently with the switch, said plate having an arcuate slot through which said shoe extends, said slot being widened at one of its ends, being provided with an uninterrupted edge wall, and having a stop on its other edge wall at the juncture of its wide and narrow ends, a movable carrier for said shoe located at one side of said plate and active to exert a constant lateral stress on said shoe toward said uninterrupted edge wall, and a switch-tongue yieldably mounted on the other side of said plate and extending beyond said uninterrupted edge wall over the widened end of said slot, for the purpose set forth.

6. A structure as specified in claim 5; the portion of said tongue extending over said widened slot end having a shoe-receiving channel decreasing in depth toward one end for the purpose specified.

7. The combination with a motor starting switch having a switch member movable to starting and running positions, an enclosing casing for said switch member, and an operating handle on the exterior of said casing; of a plate within the casing movable concurrently with said switch member, said plate having a trackway with offset ends and a stop shoulder between them, and a relatively stationary shoe in said casing engaged with said trackway and cooperable with said stop shoulder to arrest movement of said switch member when in starting position until the handle is retrogradely moved to a predetermined extent.

8. The combination with a motor starting switch having a switch member movable to starting and running positions, an enclosing casing for said switch member, and an operating handle on the exterior of said casing; of a plate within the casing movable concurrently with said switch member, said plate having a trackway with offset ends and a stop shoulder between them; a shoe in the casing engaging said trackway, and a swinging arm carrying said shoe and pivoted to the wall of said casing, said shoe being cooperable with said stop shoulder to arrest movement of said switch member when in starting position, until the handle is retrogradely moved to a predetermined extent.

9. Control means for a switch having starting and running positions, comprising a plate member having a slot provided with an uninterrupted edge, a shoe member in the slot exerting a constant stress toward said edge, one member being relatively stationary while the other member moves concurrently with the switch, the edge of said slot opposite said uninterrupted edge having off-set ends to widen the slot at one end and form a stop shoulder between its wide and narrow ends, and a switch-tongue yieldably mounted on one side of said plate member and extending beyond the off-set edge of the slot over the wide end of the latter, for the purpose set forth.

10. A structure as specified in claim 10; said switch-tongue contacting with one side of said plate member and having spaced openings, pins projecting from said plate member and loosely received in said openings, one of said pins having a shoulder spaced outwardly from said tongue, and a spring on said one pin acting on said tongue and reacting against said shoulder, constituting the yieldable mounting means for the tongue.

In testimony whereof I have hereunto affixed my signature.

RALPH K. MASON.